(12) United States Patent
Jones et al.

(10) Patent No.: US 10,082,173 B2
(45) Date of Patent: Sep. 25, 2018

(54) SLIDING ELEMENT COMPRISING AT LEAST ONE COUPLING ELEMENT

(71) Applicants: Mahle International GmbH, Stuttgart (DE); Mahle Engine Systems UK Limited, Warwickshire (GB); MAHLE GmbH, Stuttgart (DE)

(72) Inventors: David Jones, Northamptonshire (GB); Bredo Leipprand, Stuttgart (DE)

(73) Assignees: Mahle International GmbH (DE); Mahle Engine Systems UK Ltd (GB)

( * ) Notice: Subject to any disclaimer, the term of this patent is extended or adjusted under 35 U.S.C. 154(b) by 0 days.

(21) Appl. No.: 15/240,849

(22) Filed: Aug. 18, 2016

(65) Prior Publication Data
US 2017/0051782 A1 Feb. 23, 2017

(30) Foreign Application Priority Data
Aug. 19, 2015 (GB) .................... 1514726.7

(51) Int. Cl.
F16C 17/10 (2006.01)
F16C 43/02 (2006.01)
F16C 33/20 (2006.01)

(52) U.S. Cl.
CPC .............. *F16C 17/10* (2013.01); *F16C 43/02* (2013.01); *F16C 33/201* (2013.01); *F16C 33/203* (2013.01); *F16C 2226/74* (2013.01); *F16C 2226/76* (2013.01); *F16C 2360/22* (2013.01)

(58) Field of Classification Search
CPC ...... F16C 17/10; F16C 33/4694; F16C 33/50; F16C 33/502; F16C 33/504; F16C 2226/50; F16C 2226/70; F16C 2226/74; F16C 2226/76; F16C 2226/78; F16C 33/201; F16C 33/203; F16C 2360/22; F16C 43/02

See application file for complete search history.

(56) References Cited

U.S. PATENT DOCUMENTS 1,644,611 A * 10/1927 Rieffert ................ F16C 33/60
384/501
3,399,008 A * 8/1968 Farrell ..................... F16C 9/04
384/577
(Continued)

FOREIGN PATENT DOCUMENTS

DE 2433929 A1 2/1976
DE 2711938 A1 9/1977
(Continued)

OTHER PUBLICATIONS

English abstract for DE-10230425.
(Continued)

*Primary Examiner* — Alan B Waits
(74) *Attorney, Agent, or Firm* — Fisherman Stewart PLLC

(57) ABSTRACT

A sliding element, e.g., a sliding element for slidably supporting a rotatable shaft, may include a first sliding element component, a second sliding element component, and at least one coupling element. The at least one coupling element may be configured to be coupled to the first sliding element component and may be configured to be coupled to the second sliding element component to releasably couple the first sliding element component and the second sliding element component together.

19 Claims, 10 Drawing Sheets

(56) References Cited

U.S. PATENT DOCUMENTS

| | | | | |
|---|---|---|---|---|
| 3,713,714 | A * | 1/1973 | Hill | F16C 17/10 384/294 |
| 3,972,576 | A * | 8/1976 | Hill | F16C 17/10 384/276 |
| 4,288,895 | A * | 9/1981 | Campbell | B23K 26/28 219/121.85 |
| 4,533,261 | A * | 8/1985 | Losio | F16C 17/10 384/129 |
| 4,652,150 | A * | 3/1987 | New | F16C 17/10 384/275 |
| RE32,764 | E * | 10/1988 | Smith | F16C 17/10 384/275 |
| 4,875,784 | A | 10/1989 | Just | |
| 4,924,523 | A * | 5/1990 | Gojon | F16C 17/10 384/273 |
| 4,989,998 | A * | 2/1991 | Willis | F16C 17/10 384/275 |
| 5,044,787 | A * | 9/1991 | Hupfer | F16C 33/4623 384/572 |
| 5,114,246 | A * | 5/1992 | Gowan | F16C 17/10 384/275 |
| 5,267,797 | A * | 12/1993 | Brandt | F16C 17/10 384/273 |
| 5,462,365 | A * | 10/1995 | Brandt | F16C 17/10 384/275 |
| 5,520,466 | A * | 5/1996 | Everitt | F16C 9/02 384/124 |
| 5,630,669 | A * | 5/1997 | Stewart | F16C 19/26 384/570 |
| 5,964,337 | A * | 10/1999 | Hallahan | B65G 13/11 193/35 R |
| 6,149,310 | A * | 11/2000 | Ono | F02F 7/0053 384/294 |
| 6,364,533 | B1 * | 4/2002 | van der Knokke | F16C 33/4611 384/572 |
| 6,471,405 | B1 * | 10/2002 | Bickle | F16C 17/10 384/275 |
| 8,002,473 | B2 * | 8/2011 | Becker | F16C 9/04 384/130 |
| 8,057,105 | B2 * | 11/2011 | Earthrowl | F16C 19/26 384/573 |
| 8,398,309 | B2 * | 3/2013 | Pierotti Ferreira | F16C 9/00 384/275 |
| 8,449,193 | B2 * | 5/2013 | Kuwabara | F16C 43/02 384/420 |
| 9,016,948 | B2 * | 4/2015 | Patel | F16C 43/02 384/420 |
| 2003/0128902 | A1 * | 7/2003 | Kennedy | F16C 9/02 384/275 |
| 2005/0223546 | A1 | 10/2005 | Klier et al. | |
| 2011/0200281 | A1 * | 8/2011 | Uehara | F16C 9/00 384/428 |
| 2014/0177987 | A1 * | 6/2014 | Roberto | F16C 17/10 384/275 |
| 2016/0160908 | A1 * | 6/2016 | Gallas | F16C 43/02 384/368 |

FOREIGN PATENT DOCUMENTS

| | | | |
|---|---|---|---|
| DE | 2924552 A1 | 1/1981 | |
| DE | 3730165 A1 * | 3/1989 | F16C 17/10 |
| DE | 3802275 A1 | 8/1989 | |
| DE | 4204988 C1 | 6/1993 | |
| DE | 4220585 A1 * | 1/1994 | F16C 33/4635 |
| DE | 10230425 A1 | 1/2004 | |
| EP | 0325749 A2 | 8/1989 | |
| EP | 2233759 A2 | 9/2010 | |
| WO | WO-2013/068106 A1 | 5/2013 | |
| WO | WO-2014/091206 A1 | 6/2014 | |
| WO | WO-2015/007826 A1 | 1/2015 | |

OTHER PUBLICATIONS

English abstract DE-4204988.
English abstract DE-2924552.
GB Search Report for GB-1514726.7, dated Feb. 9, 2016.
English abstract for EP-2233759.
English abstract for DE-2711938.
German Search Report dated Oct. 12, 2017 corresponding to related German Patent Application No. 10 2016 214 604.1.

* cited by examiner

SLIDING ELEMENT COMPRISING AT LEAST ONE COUPLING ELEMENT

CROSS-REFERENCE TO RELATED APPLICATIONS

This application claims priority to British Patent Application No. 1514726.7, filed Aug. 19, 2015, the contents of which are hereby incorporated by reference in its entirety.

TECHNICAL FIELD

This invention relates to a sliding element comprising at least one coupling element.

Sliding elements according to preferred embodiments of the present invention are particularly suitable for use as flanged (or flange) bearings, flanged half-bearings and flanged bushes for use in automotive applications, for example in automotive engines (e.g. for supporting crankshafts), transmissions, pumps and compressor systems.

BACKGROUND

In internal combustion engines, the bearing assemblies typically each comprise a pair of half-bearings retaining a crankshaft that is rotatable about an axis. For crankshaft journal bearing assemblies, at least one half-bearing may be a flanged half-bearing that comprises a hollow, generally semi-cylindrical, half-shell bearing provided with a generally semi-annular thrust washer extending outwardly (radially) at each axial end.

OEMs in the automotive sector, including engine and subassembly manufacturers, typically specify that an assembled flanged bearing is supplied as part of the main bearing set. This allows for ease of installation and keeps the thrust washer in place during the life of the engine. The assembled flanged bearing is expected to be rigid enough to cope with transportation and handling by operators and/or robots and to be flexible enough to accommodate machining tolerances in the engine and to permit installation, e.g. into the designated space in an engine block. The flanged bearing is typically required to be provided with some means for supporting torque loads of the engine without the thrust washers becoming detached and to oppose rotation of the thrust washers relative to the half-shell bearing.

In some known flanged half-bearings, a single-piece construction of the half-shell bearing and thrust washers is used.

In other known flanged half-bearings, such as the one described in published US patent application number US2005223546, the half-shell bearing and the thrust washer are permanently assembled using by a joining process such as laser welding. Disadvantages of this type of arrangement include that the weld spot can break and the debris can pass into the clearance space between the journal and bearing and that the resulting assembly can be very stiff, affecting the ease with which it can be installed into an engine block.

In a further type of flanged half-bearings, the thrust washers are permanently assembled onto the half-shell bearing by deformation of corresponding engagement features.

With reference to FIGS. 1-4, other known features for mechanically engaging a thrust washer around the outer surface of a half-shell bearing, at an axial end, include a generally semi-annular panel with a pair of hooking lugs (or tongs) projecting inwardly from the semi-circular inner edge. The hooking lugs hook into corresponding openings in the half-shell bearing when the thrust washer is connected around the outer surface at an axial end of the half-shell bearing. The inwardly projecting hooking lugs are located to either side of the crown of the bearing, towards the joint faces, and are shaped to enable the thrust washer to be assembled onto the half-shell bearing when the half-shell bearing is resiliently or elastically deformed by pinching together the joint faces (circumferential end faces). The arrangement by which the hooking lugs engage with the openings (recesses) prevents separation once the half-shell bearing has returned to the relaxed position, and also prevents separation when the half-shell bearing has been slightly pinched together through being held in an interference fit with a housing, within the full bearing assembly. The hooking lugs typically have a uniform thickness and are machined to be thinner than the main semi-annular panel of the thrust washer, to enable the use of (axially) narrow openings in the half-shell bearing. One or more stabilisation lugs may be provided intermediate the hooking lugs, projecting inwardly from the inner edge of the semi-annular main panel, to reinforce the connection between the thrust washer and half-shell bearing, to prevent wear leading to substantial relative rotation of the thrust washer and half-shell bearing.

The prior art includes U.S. Pat. No. 4,533,261 and European patent number EP2233759 which provide flanged half-bearings in which thrust washers are loosely mechanically engaged with half-shell bearings using thin hooking lugs of uniform thickness that are receivable within openings in a corresponding half-shell bearing.

The prior art also includes PCT publication number WO2013/068106 which provides a flanged half-bearing (330) comprising at least one substantially semi-annular thrust washer (100A, 100B) with an internal periphery having lateral lugs (104A, 104B) and an Intermediary stabilisation lug (106) projecting from the Internal periphery (108) of the thrust washer, and a semi-cylindrical half journal half-shell bearing (220) having lateral recesses (226A, 226B) and an intermediary stabilisation recess (228) that are recessed into an axial end face (224A, 224B) of the half-shell bearing and are respectively connected to the lateral lugs and the stabilisation lug of the thrust washer, wherein the stabilisation lug (106) has rotational stabilisation edges (114) that project substantially perpendicularly from the inner periphery (108) of the thrust washer, and the stabilisation recess (228) is configured for axial relative movement of stabilisation lug; and an engine comprising at least one such flanged half-bearing (330).

The prior art also includes PCT publication number WO2015/007826 which provides a thrust washer (100) for a flanged half-bearing, the thrust washer comprising: a substantially semi-annular panel (102) having an inner edge (108) and outer edge; and hooking lugs (110) projecting inwardly from the inner edge of the panel, wherein the hooking lugs have latching edges (118) that are configured to engage within corresponding openings in a half-shell bearing received by the thrust washer and to prevent disconnection of the thrust washer and half-shell bearing without deformation of the half-shell bearing, each hooking lug has a hooking lug inner portion (104A) proximate, around the inner edge of the panel, to the central part of the thrust washer for engaging against edges of the openings in the half-shell bearing and a hooking lug outer portion (104B) remote, around the inner edge of the panel, from the central part of the thrust washer, and the hooking lug inner portion is thinner than the hooking lug outer portion.

The inventors have appreciated that there may be a number of limitations or disadvantages associated with known types of flanged half-bearings such as those described in the aforementioned prior art references and illustrated in FIGS. 1 to 4. These may comprise one or more of the following, among others:

i. shown in FIGS. 1 to 4, the prior art flanged half-bearings 1 use clips or 'tangs' 2,3,4,5 proximate the ends of the thrust washers 6,7 for engagement with corresponding notches or recesses 8,9,10,11 proximate the ends of the half-shell bearing 12. These tangs are typically the only thing which hold the thrust washers in engagement with the half-shell bearing. It may be fiddly to engage the tangs with the corresponding notches or recesses which may necessitate manual handling of the thrust washers and the half-shell bearing;

ii. the tangs of the prior art devices may require the ends of the half-shell bearing to be pinched to permit engagement of clips or 'tangs' with corresponding notches or recesses;

iii. formation of the close tolerance tangs and corresponding notches of the prior art devices may lead to an increase in the manufacturing lead time;

iv. the tangs of the prior art devices may lead to scrappage of a higher proportion of assembled flanged half-bearings than may be desirable due to the thrust washers not being correctly fitted to the half-shell bearing or becoming detached from the half-shell bearing during transportation and handling;

v. the tangs and the corresponding notches or recesses of the prior art being the only thing that forms a self-supporting flanged half-bearing necessitates the use of close tolerances between the tangs and the corresponding notches or recesses. This may require the use of certain manufacturing processes and rigid quality controls;

vi. the need for close tolerances may also necessitate the use of post-processing operations, such as deburring or the removal of ledges on the tangs and/or the corresponding notches or recesses which may result from the initial forming operation, or the machining of one or more chamfers to facilitate engagement of the tangs and the corresponding notches or recesses. This has the potential to introduce debris (e.g. swarf or metal particulate) which may have an adverse impact on the performance of the half-shell bearing and/or the thrust washers;

vii. the need for additional post-processing operations may add to the cost of manufacture and may have an impact on the manufacturing lead time. It may also contribute to a higher proportion of the thrust washers and/or half-shell bearings being scrapped than may be desirable due to errors in the post-processing operations;

viii. the tangs of the prior art devices, may lead to the resulting flanged half-bearing assembly having greater stiffness, or lower flexibility, than may be desirable for simple and effective installation of the flanged half-bearing into a recess in an engine housing;

ix. the use in some prior art devices of lines or runs of tack welding to permanently join the thrust washers and the half half-shell bearing may necessitate the use of jigs to support each assembly during manufacture. The resulting flanged half-bearing may also be relatively stiff and have low flexibility which may be undesirable for simple and effective installation of the flanged half-bearing into the end product, for example an engine housing; and x. the use of welding also has the potential to introduce impurities and/or debris (e.g. weld dust) which may have an adverse impact on the performance of the half-shell bearing and/or the thrust washers.

SUMMARY

The inventors have appreciated that there is a need for an improved sliding element, particularly one to be used as a flanged half-bearing or flanged bearing, that is more effective than known types of sliding elements, particularly known types of flanged half-bearings or flanged bearings, for use in automotive engine applications, including in engines operating stop-start schemes and in particular where the sliding element is to be used to support rotating components such as a crankshaft. The inventors have also appreciated that there is a need for a sliding element that is self-supporting and sufficiently rigid for transportation and handling yet sufficiently flexible to enable it to be installed into a housing (e.g. an engine block) without separation of the thrust washers from the half bearing.

In the following description, the term "coupling element" is preferably used to refer to an element that is an auxiliary, or separate (i.e. different), component from other components of the sliding element. As discussed below, there are clear advantages associated with the use of an auxiliary, or separate, coupling element. However, it is possible that the coupling element may be coupled to a first component of the sliding element component before the coupling element is then also coupled to a second component of the sliding element.

The present invention is defined in the appended independent claims and provides, in a first aspect, sliding element for slidably supporting a rotatable shaft, comprising: —a first sliding element component; a second sliding element component; and at least one coupling element configured to be coupled to the first sliding element component and configured to be coupled to the second sliding element component so as to releasably couple the first sliding element component and the second sliding element component to form the sliding element.

In preferred embodiments of the present invention, the sliding element may take the form of a flanged half-bearing which comprises a half-shell bearing and a pair of thrust washers coupled to the half-shell bearing to form a self-supporting assembly.

Preferred embodiments of the present invention are particularly suitable for use in one or more of the following: automotive engines; transmissions; pumps; and compressor systems.

The inventors believe that the improved sliding element of the present invention may have a number of advantages over the prior art devices, which may comprise some or all of the following, among others:

i. the use of at least one coupling element instead of the tangs of some prior art devices to couple the half-shell bearing and the thrust washers may reduce the complexity of the sliding element compared to prior art devices and make it quicker and easier to assemble the flanged half-bearing;

ii. the use of at least one coupling element instead of the tangs of some prior art devices may reduce or eliminate the need for pinching of the half-shell bearing in order to engage with the tangs of thrust washers;

iii. the use of at least one coupling element instead of the tangs of some prior art devices may reduce the manufacturing lead time due to the removal of fiddly manual operations;

iv. the use of at least one coupling element instead of the tangs of some prior art devices may reduce or eliminate the volume of scrap of reject prior art flanged half-bearings which have been incorrectly assembled or which have become detached during transportation and handling;

v. the use of at least one coupling element instead of the tangs of some prior art devices may reduce or eliminate the need for close tolerances between the tangs and the corresponding notches or recesses which may simplify the manufacturing process and reduce the associated cost;

vi. the use of at least one coupling element instead of the tangs of some prior art devices may reduce or eliminate the need for port-processing operations, including deburring or the removal of ledges on the tangs and/or the corresponding notches or recesses which may result from the initial forming operation. This may further simplify the manufacturing process and reduce the associated cost. It may also reduce or eliminate the introduction of debris (e.g. swarf or metal particulate) which may otherwise have an adverse impact on the performance of the half-shell bearing and/or the thrust washers;

vii. the use of at least one coupling element instead of the tangs or welding of some prior art devices may reduce the stiffness and increase the flexibility of the resulting flanged half-bearings. This may facilitate installation of the flanged half-bearings into the end product, for example an engine housing. It may also reduce the proportion of scrap compared to prior devices that may be too stiff and insufficiently flexible to be installed into an engine housing;

viii. the use of at least one coupling element instead of the welding used in some prior art devices may reduce or eliminate the associated debris (e.g. weld dust) which may otherwise have an adverse impact on the performance of the half-shell bearing and/or the thrust washers;

ix. the at least one coupling element may be made from a plastics material. Preferably, there will not be any degradation or dissolving of the at least one coupling element during use of the flanged bearing. However, the use of at least one coupling element instead of the welding used in some prior art devices may mean that if there were any minor degradation or dissolving of the at least one coupling element, the resulting debris may be softer than the metal debris that is commonly associated with the prior art devices incorporating welding and may therefore be more likely to pass through the bearing clearance without damaging to the running surfaces of the thrust washers and/or the half-shell bearing or affecting the performance of the flanged half-bearing; and x. the at least one coupling element may be used to couple sliding element components made from, or coated with any chosen materials. For example, the at least one coupling element may be used to couple sliding element components comprising a polymer-based running layer and irrespective of whether it contains any additives or particulate materials.

In arriving at the present invention, the inventors have reduced the manufacturing complexity of prior art devices incorporating close tolerance tangs and have taken the counterintuitive step of replacing the tangs that are integrally formed with other components of the sliding element with a separate coupling element. The inventors have taken a step back from the known path of development of flanged half-bearings and made an improvement which has a number of clear advantages compared to the use of known flanged half-bearings.

The inventors have appreciated that selection of the material and properties of the coupling element is an important factor in the performance of the resulting sliding element. Preferably, the coupling element will have some or all of the following properties, among others:

i. provide a suitable balance between stiffness and flexibility of the resulting sliding element so that it remains intact during handling and transportation but can also be more easily aligned with and positioned into a housing;

ii. offer good resistance to degradation in the presence of lubricants such as engine oil;

iii. offer good resistance to degradation when subject to the operating temperatures associated with automotive engines; and iv. offer some resistance to torque loads. However, as discussed below in relation to preferred embodiments of the present invention, the torque load capability need not be particularly high due the presence of other engagement features (e.g. tabs and corresponding notches).

Some preferred features of the present invention are set out in the dependent claims to which reference should now be made.

Preferably, the sliding element is for supporting a crankshaft and/or a camshaft. Preferably, the sliding element is for supporting a crankshaft for an engine for automotive applications.

Preferably, the first sliding element component comprises at least one first engagement feature and the second sliding element component comprises at least one second engagement feature, the at least one first engagement feature engageable with the at least second engagement feature and the at least one coupling element configured to be coupled to the at least one first engagement feature and configured to be coupled to the at least one second engagement feature so as to releasably couple the first sliding element component and the second sliding element component to form the sliding element.

Preferably, the first engagement feature comprises at least one tab and the second engagement feature comprises at least one notch, the at least one tab being engageable with the at least one notch, the at least one coupling element configured to be coupled to the at least one tab and configured to be coupled to the at least one notch so as to releasably couple the first sliding element component and the second sliding element component to form the sliding element. The at least one tab and at least one notch may prevent the thrust washers from rotating during use of the flanged half-bearing, relative to the half-shell bearing, or at least prevent the thrust washers from rotating beyond a certain number of degrees of rotation which corresponds to the tolerance between the at least one tab and the at least one notch.

Preferably, the at least one coupling element comprises at least one resilient (or resiliently biased) portion.

Preferably, the at least one coupling element comprises at least one resilient (or resiliently biased) fastener.

Preferably, the at least one coupling element comprises at least one resilient (or resiliently biased) clip. The coupling element may, for example, may be a spring clip.

Preferably, the at least one coupling element is made from a different material to a material of the first sliding element component and a material of the second sliding element component. This makes the use of an auxiliary, or separate (i.e. different), coupling element particularly advantageous as it can be made from any material (or composite material) to give it the most desirable properties. It may, for example, be made from a plastics material while the first and second sliding element components may be made from, or coated with metal or an alloy.

The at least one coupling element may be made from a plastics material. Preferably, the material is resistant to operating temperatures and lubricants typically used in engines for automotive applications. Suitable plastics materials include Polyether ether ketone (PEEK) or Polyphthalamide (PPA). Coupling elements made of plastics material may be produced using an injection moulding or injection extrusion process.

Alternatively, the at least one coupling element may be made from metal. It may, for example, be made from medium-carbon steel or high-carbon steel (spring steel) or from formed wire. Suitable processes for manufacturing coupling elements made from metal will be well-known to the skilled person.

Alternatively, the at least one coupling element may be made from a shape memory material (e.g. a shape-memory alloy or a shape-memory polymer). This may give the sliding element a variable degree of flexibility, depending on the temperature to which it is subjected. For example, at a lower temperature (e.g. at an assembly temperature), the coupling element may permit greater relative movement between the first sliding element component (e.g. a thrust washer) and the second sliding element component (e.g. a half-shell bearing) whereas at higher temperatures (e.g. during operation of the sliding element in an automotive engine environment), the coupling element may only permit lesser, or more restricted, relative movement between the first sliding element component and the second sliding element component. This is primarily due to expansion of the shape memory material at higher temperatures.

Preferably, the at least one notch is provided with at least one wall feature for resisting ejection of the at least one coupling element from the at least one notch.

Preferably, the at least one wall feature comprises at least one angled portion of at least one wall of the at least one notch.

Alternatively, the at least one wall feature comprises at least one projection projecting from at least one wall of the at least one notch. This may form a narrowing of the opening of the notch or a shoulder.

The sliding element may comprise a plurality of coupling elements, each one configured to be coupled to the first sliding element component and configured to be coupled to the second sliding element component so as to releasably couple the first sliding element component and the second sliding element component to form the sliding element.

Where multiple tabs, notches and clips are to be used, preferably they will each be identical. However, this need not be the case. For example, one or more of the tabs or notches may have different dimensions to the others and the clips may be sized accordingly. One or more of the clips may be made from a different material or may offer a different degree of resilience to the others.

Preferably, the first sliding element component comprises a bearing element (e.g. a half-shell bearing). The half-shell bearing may be a simple known type of half-shell bearing, such as a metal or bi-metal half-shell bearing that is typically used in the construction of flanged half-bearings for automotive engine applications. Alternatively, the bearing may, for example, comprise a polymer-based running layer or a sintered coating of a suitable material.

Preferably, the second sliding element component comprises at least one thrust washer. More preferably, the second sliding element component comprises a pair of thrust washers. The thrust washers may be identical or different from one another. The thrust washers may be a simple, known-type of thrust washer, such as a metal or bi-metal thrust washer that is typically used in the construction of flanged half-bearings for automotive engine applications. Alternatively, the bearing may, for example, comprise a polymer-based running layer or a sintered coating of a suitable material.

Particularly suitable thrust washers comprise, for example, improved thrust washers of the type described in published international patent application number WO2014/091206, providing a thrust washer comprising a polymer layer of profiled thickness, or of the type described in United Kingdom Patent Application No. 1507205.1 providing a thrust washer comprising a polymer-based running layer comprising a textured surface. However, these thrust washers may require some modification in accordance with the present invention.

Preferably, the first sliding element component (e.g. a half-shell bearing), comprises a single recess or cut-out in each side of the half-shell bearing that is positioned at, or near to, the crown of the half-shell bearing. Preferably, the second sliding element component (e.g. the thrust washers), comprises a single tab extending at or near the crown of each thrust washer in a direction that is perpendicular to a tangent to the curved outer surface of the thrust washer. In other words, the single tab preferably extends towards a centre of curvature of the thrust washer. Preferably, the tabs are engageable with the recesses so as to interlock the first and second sliding element components and constrain them relative to one another so as to prevent any significant relative rotation of the first and second sliding element components.

Alternatively, the first sliding element component (e.g. a half-shell bearing) may comprise a single tab and the second sliding element component (e.g. the thrust washers), may comprise a single recess or cut-out (i.e. the reverse of the arrangement described above).

An advantage of the use of a recess at or near the crown of the first sliding element component (e.g. the half-shell bearing) and a tab extending at or near the crown of the second sliding element component (e.g. the thrust washers) is that these engagement features may be formed during the initial forming operation (e.g. by stamping, laser cutting or another suitable process) when the first and second sliding element components are formed as blanks from sheet material. The interlocking or interleaved nature of the arrangement of the components, particularly the thrust washers, on a sheet of raw material is such that the tabs are formed from raw material that might otherwise be discarded as scrap.

The recesses of the first sliding element component (e.g. the half-shell bearing) and the tabs of the second sliding element component (e.g. the thrust washers) may be spaced from the crown of first sliding element component and the second sliding element component so as to provide a mistake-proofing (or 'poka-yoke') device to assist operators on the manufacturing line to identify the correct orientation of the thrust washers relative to the half-shell bearing.

Preferably, one or both of the half-shell bearing and the thrust washers comprises a polymer-based running layer. Other running layer materials may also be used, including a sintered coating of a suitable material. A further advantage of sliding elements according to preferred embodiments of the present invention comprising a coupling element is that, unlike in some known machined flanged bearings, different materials can be used for the bearing and thrust washer running surfaces or running layers. For example, one of them may have a polymer-based running layer and the other may have a running layer or surface made from a different material (e.g. a metal or alloy).

Preferably, the polymer-based running layer is formed on the half-shell bearing and/or the thrust washer substrate by a spraying or a screen printing process.

The polymer-based running layer may be applied directly to the thrust washer substrate and/or the half-shell bearing substrate. Alternatively, the polymer-based running layer may be applied to an intermediate layer applied to the thrust washer substrate and/or the half-shell bearing substrate. The thrust washer substrate and/or the half-shell bearing substrate may be a metal or bi-metal substrate. The intermediate layer may also be a metal or bi-metal layer.

The polymer-based running layer may be formed by depositing a plurality of polymer-based sub-layers. The plurality of polymer-based sub-layers may comprise sub-layers of the same or different thicknesses. Successive polymer running layers may be differently patterned, to build up a profiled polymer-based running layer of non-uniform thickness. The use of sub-layers may provide greater control of the thickness of the profiled polymer running layer.

The present invention is further defined in the appended independent claims and provides, in a second aspect a flanged half-bearing comprising the sliding element of the first aspect of the invention.

The present invention is further defined in the appended independent claims and provides, in a third aspect a flanged bush comprising the sliding element of the first aspect of the invention.

The present invention is further defined in the appended independent claims and provides, in a fourth aspect, an engine comprising the sliding element of the first aspect of the invention or the flanged half-shell bearing of the second aspect of the invention or the flanged bush of the third aspect of the invention.

The present invention is further defined in the appended independent claims and provides, in a fifth aspect, a method of assembling a sliding element for slidably supporting a rotatable shaft, comprising the steps of: —providing a first sliding element component; providing a second sliding element component; providing at least one coupling component; positioning the first sliding element component and the second sliding element component proximate one another; and coupling the at least one coupling element to the first sliding element component and coupling the at least one coupling element to the second sliding element component so as to releasably couple the first sliding element component and the second sliding element component to form the sliding element.

The present invention is further defined in the appended independent claims and provides, in a sixth aspect, a kit of parts for a sliding element for slidably supporting a rotatable shaft, comprising: —a first sliding element component; a second sliding element component; and at least one coupling element; wherein the at least one coupling element is coupleable to the first sliding element component and the at least one coupling element is coupleable to the second sliding element component so as to releasably couple the first sliding element component and the second sliding element component to form the sliding element.

The axial face of each thrust washer may be provided with one or more oil distribution grooves running between the inner and outer edges of the thrust washer. Preferably, the oil distribution grooves extend across the thrust washer from the inner edge to the outer edge in a continuous arrangement enabling through flow of oil. The axial face of the polymer-based running layer may therefore comprise a plurality of disconnected portions, separated by the one or more oil distribution grooves. The provision of the oil distribution grooves in the axial face of the thrust washer may enhance the quality of the oil film between the thrust washer and the shaft. In use, lubricating oil may be pumped into the bearing clearance between the corresponding half-shell bearing and rotating crankshaft journal, and leaks out into the further clearance between the thrust washer and the counterface of the rotating crankshaft web.

The thrust washers and/or the half-shell bearing may be provided with joint face relief portions at one or both ends.

Although the various Figures and the associated description show flanged half-bearings (i.e. flanged semi-annular bearings), the present invention equally applies to flanged bearings (i.e. flanged annular bearings).

BRIEF DESCRIPTION OF THE DRAWINGS

Some example embodiments of the present invention will now be described with reference to the accompanying drawings, in which.

DETAILED DESCRIPTION

Figure 1:
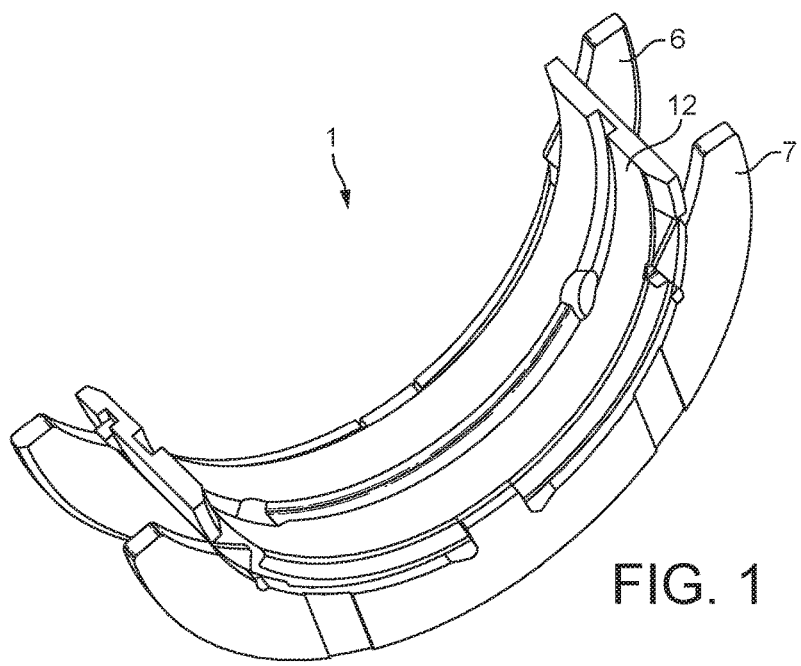
FIG. 1 is a perspective view of a prior art sliding element in the form of a flanged half-bearing assembly comprising a half-shell bearing and a pair of thrust washers.
Figure 2:
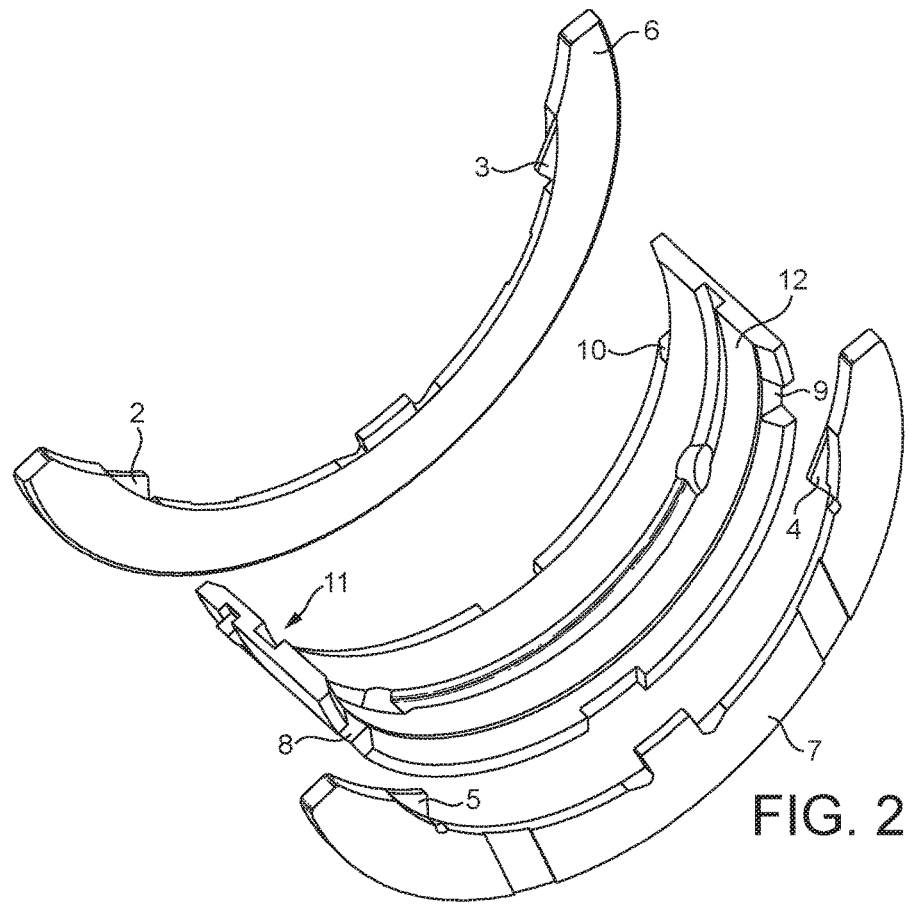
FIG. 2 is an exploded perspective view of the prior art sliding element of FIG. 1.
Figure 3:
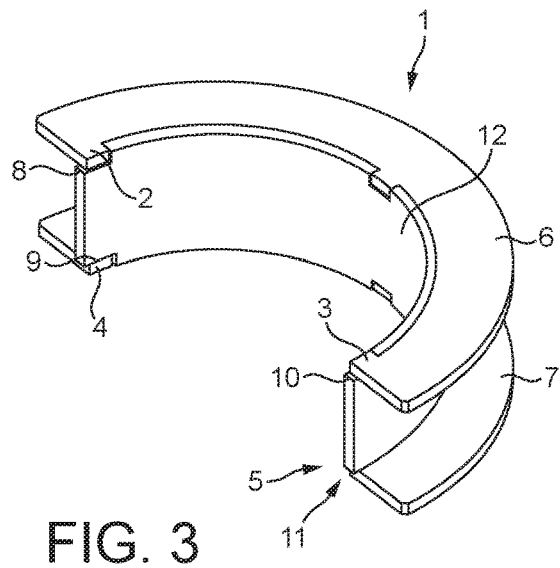
FIG. 3 is a perspective view of a further prior art sliding element in the form of a flanged half-bearing assembly comprising a half-shell bearing and a pair of thrust washers.
Figure 4:
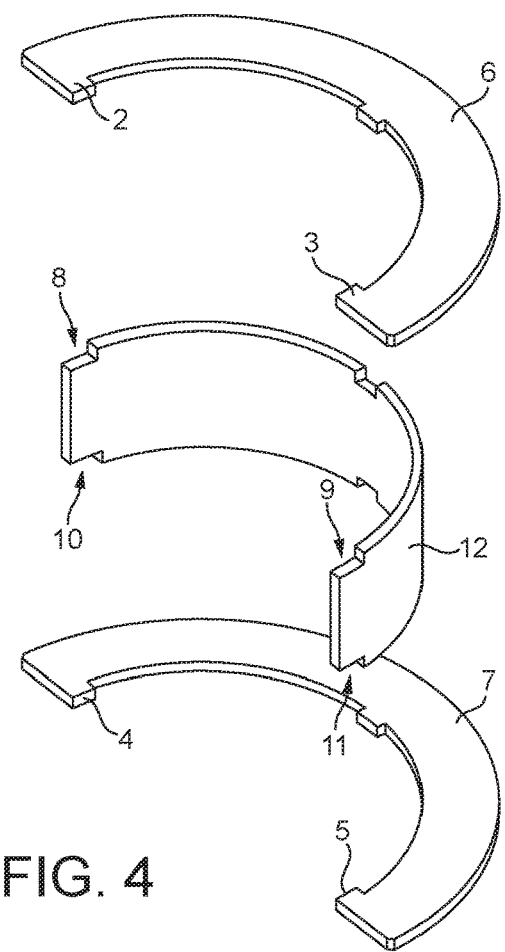
FIG. 4 is an exploded perspective view of the prior art sliding element of FIG. 3.

FIGS. 5 to 9 illustrate a sliding element 20 according a first example embodiment of the present invention in which the sliding element takes the form of a flanged half-bearing comprising a half-shell bearing 21 and a pair of thrust washers 22, 23.

The semi-annular half-shell bearing 21 comprises a notch 24, 25 (or recess or cut-out or slot) on each side of the back of the bearing at or near the crown. Each semi-annular thrust washer 22, 23 comprises a tab (or tag or projection) 26, 27 extending towards a centre of curvature of the thrust washer.

Figure 5:
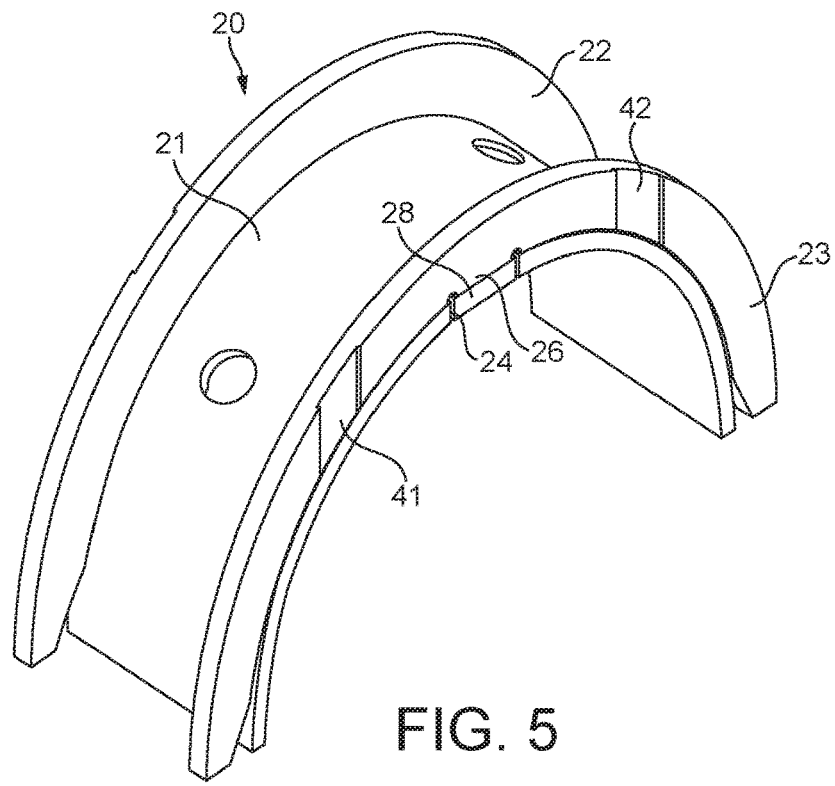
FIG. 5 is a perspective view of a sliding element according to a first example embodiment of the present invention in the form of a flanged half-bearing assembly comprising a half-shell bearing, a pair of thrust washers and a coupling element.

The notches 24, 25 of the half-shell bearing are configured to receive the tabs 26, 27 of the thrust washers so that when the tabs of the thrust washers are received within the notches, a face of each thrust washer that connects the annular side faces (i.e. a lower surface of each thrust as shown in the Figures) abuts a back side of the half-shell bearing (i.e. the upper surface of the half-shell bearing shown in FIG. 5).

As will be discussed further below, one important advantage of the use of a coupling element to couple the half-shell bearing and the thrust washers instead of the close tolerance tangs of some prior art flanged half-bearings, is that the tabs and the notches do not need to be precision machined and need only have quite loose tolerances. In other words, the tabs need only have a relatively loose fit within the notches that is looser than the fit that is required by known flanged half-bearings comprising tangs.

Figure 8:
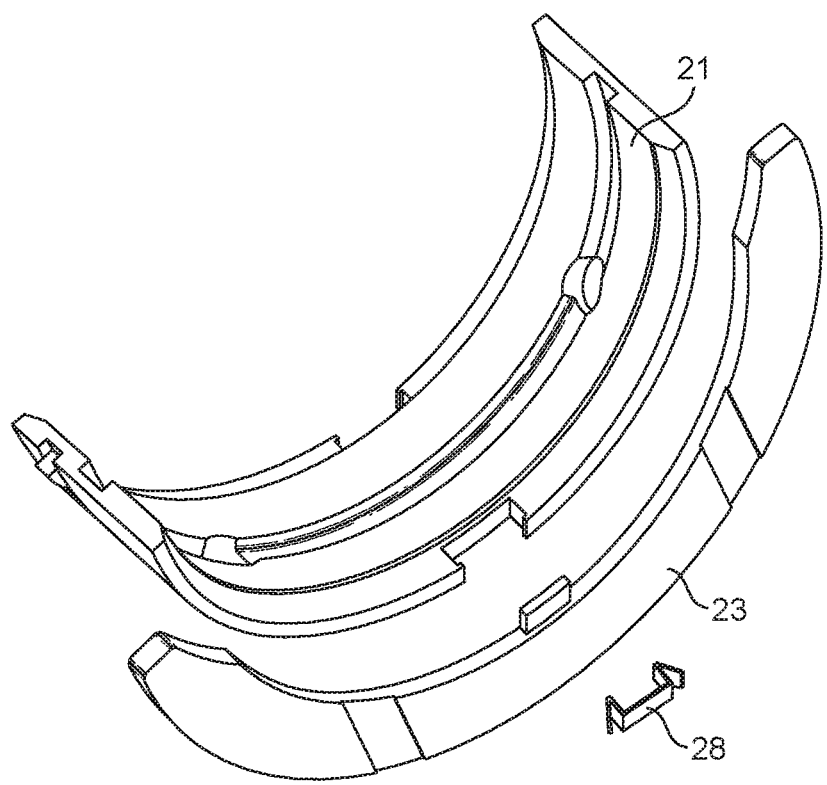
FIG. 8 is an exploded perspective view of the sliding element of FIG. 5.
Figure 9:
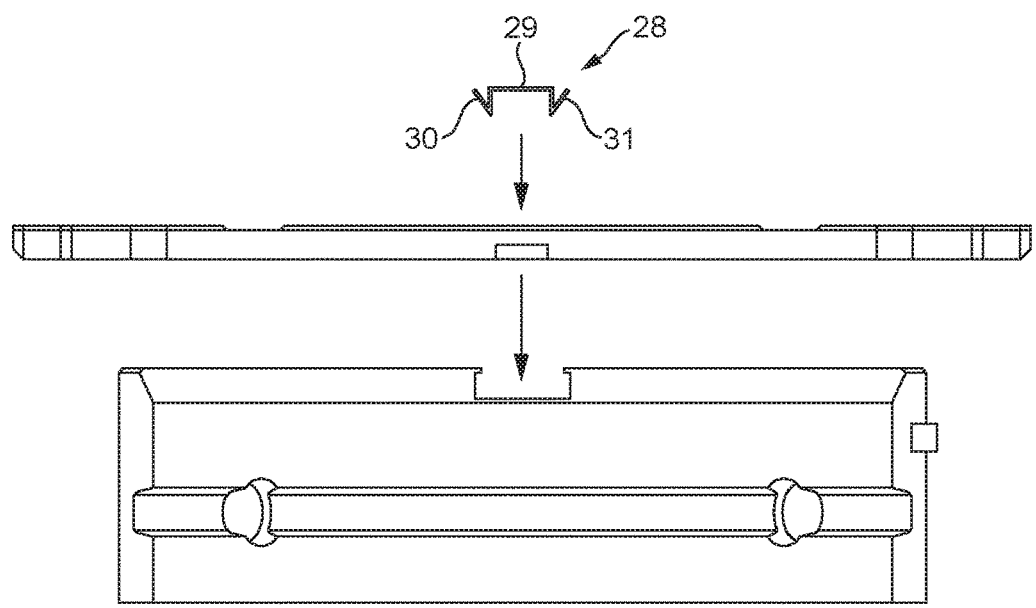
FIG. 9 is a top view of the sliding element of FIG. 5 showing one of the thrust washers and the coupling element being brought into engagement with the half-shell bearing.
Figure 10:
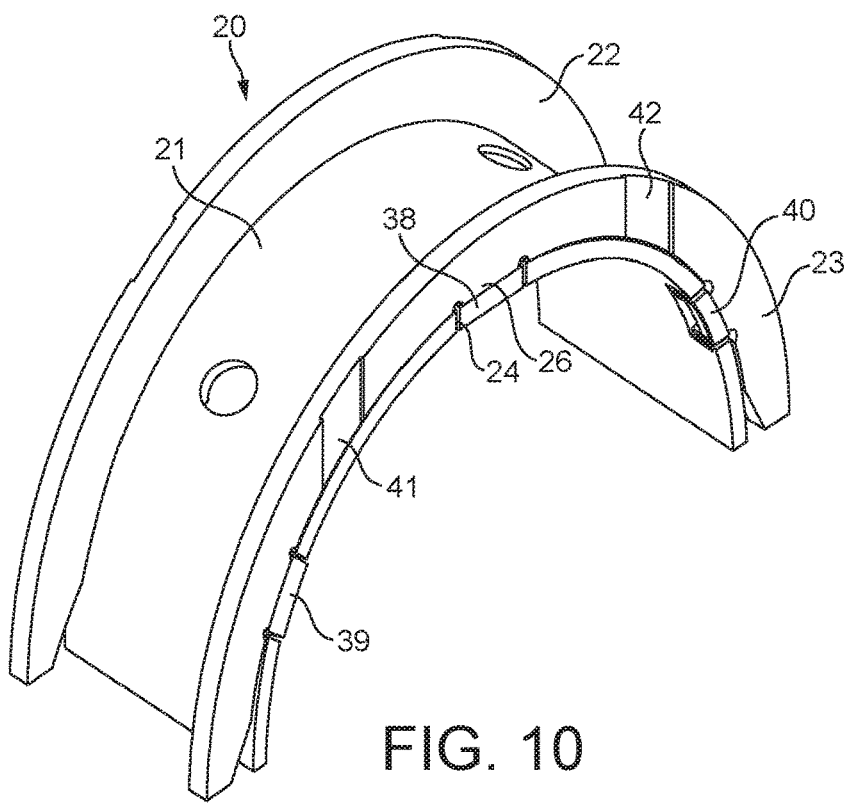
FIG. 10 is a perspective view of a sliding element according to a second example embodiment of the present invention in the form of a flanged half-bearing assembly comprising a half-shell bearing, a pair of thrust washers and three coupling elements.
Figure 11:
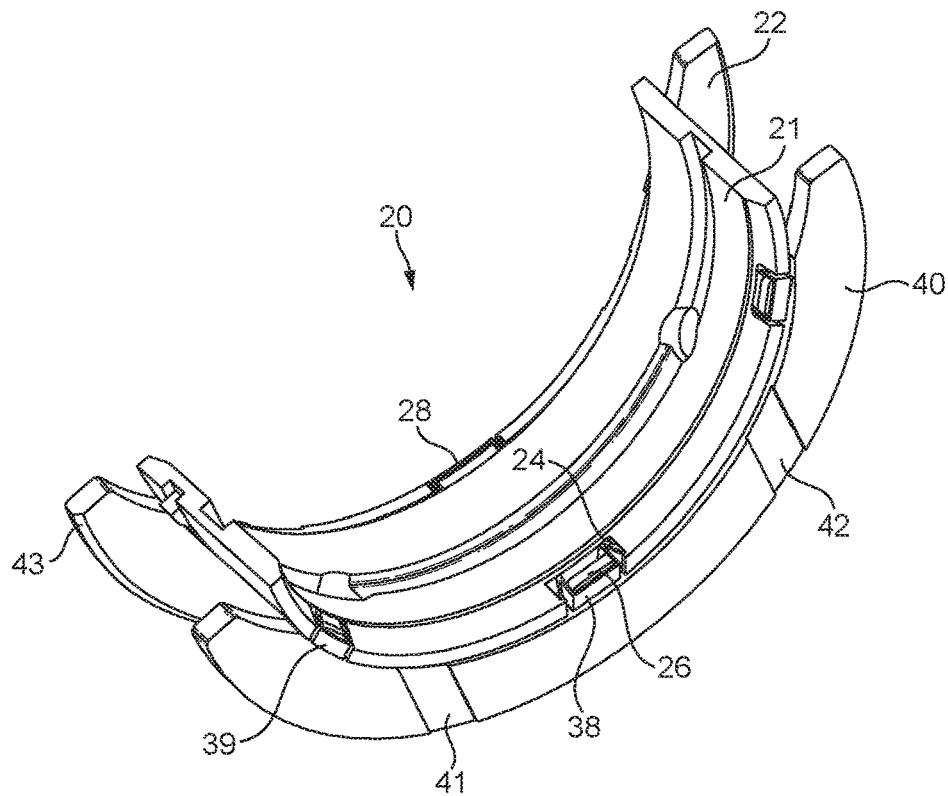
FIG. 11 is a further perspective view of the sliding element of FIG. 10.
Figure 12:
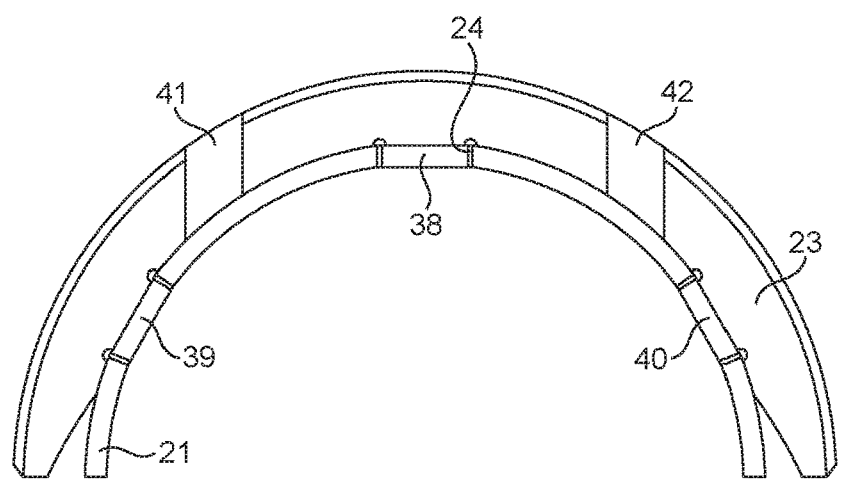
FIG. 12 is a side view of the sliding element of FIG. 10.
Figure 13:
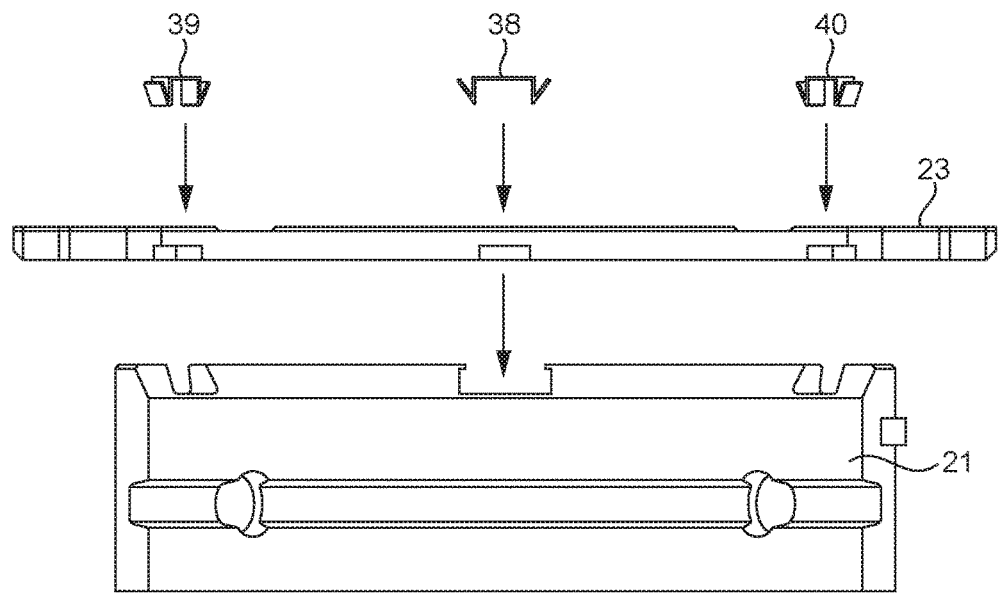
FIG. 13 is an exploded top view of the sliding element of FIG. 10 in which one of the thrust washers is being brought into engagement with the half-shell bearing and coupled to it with three coupling elements.
Figure 14:
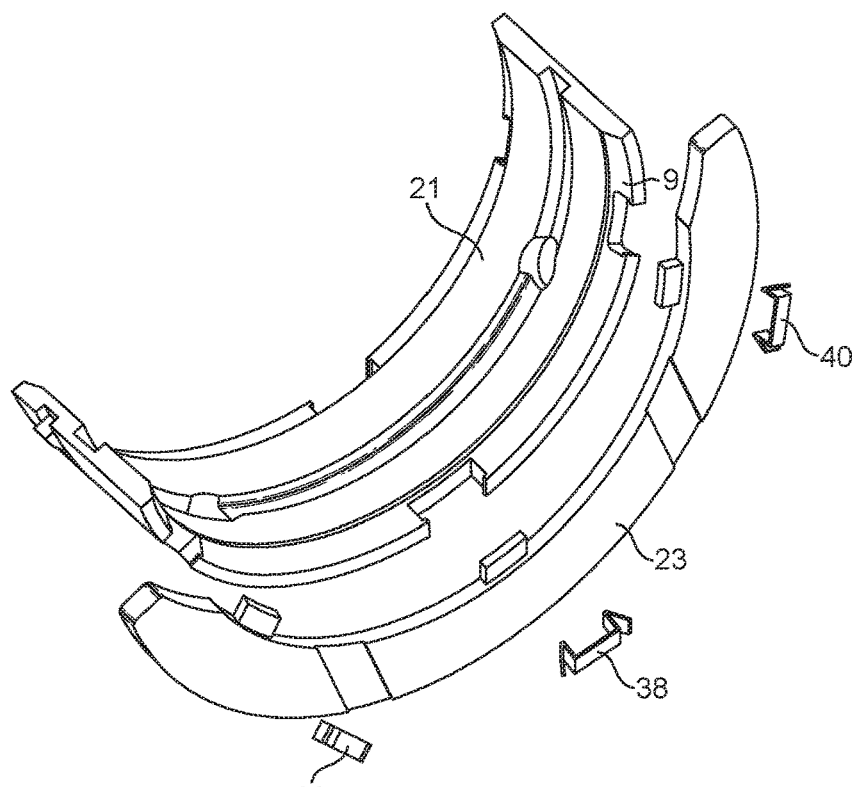
FIG. 14 is an exploded perspective view of the sliding element of FIG. 10 showing one of the thrust washers, the half-shell bearing and the three coupling elements of coupling to the thrust washers and to the half-shell bearing.

When the thrust washers and the half-shell bearing are assembled as shown in FIGS. 8 and 9 to form the flanged half-bearing 20 of FIG. 5, the thrust washers 22, 23 are supported by the half-shell bearing 21. In other words, the thrust washers are hung from opposite sides of the half-shell bearing.

A coupling element 28 is used to couple each thrust washer to the half-shell bearing. This may provide a self-supporting flanged half-bearing assembly. More specifically, a coupling element is coupled to the tab of each thrust washer and is also coupled to the notch in each side of the half-shell bearing so as to couple the each thrust washer to the half-shell bearing.

The coupling element 28 is preferably a resilient (or resiliently biased) coupling element. Preferably the coupling element is a resilient fastener, such as a clip. The resilient nature of the clip ensures that the flanged half-bearing assembly has some flexibility which makes it easier to align it with a housing (e.g. a portion of an engine block) and to insert it as it permits a small amount of relative movement between the thrust washers and the half-shell bearing.

A preferred form of a resilient clip 28 shown in FIGS. 5 to 9 has a central U-shaped portion 29 and a pair of angled arms 30, 31 projecting from the central portion. It will be appreciated that the clip may have a different configuration. For example, the arms may have a different shape and/or project from the central portion at a different angle, or from a different position (e.g. part way up the walls of the central U-shaped portion). The central portion of the clip may be straight, or curved so that it follows the curved side face of the thrust washer when inserted into the notch.

Figure 17A:
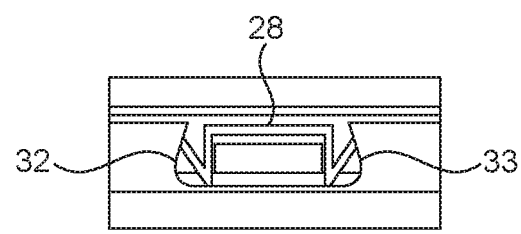
FIG. 17A is a close up view of a region of engagement between a tab of each thrust washer and a corresponding notch of the half-shell bearing of the sliding elements of the embodiments of FIGS. 5 and 10 showing a first example wall feature for opposing ejection of the coupling element(s)
Figure 17B:
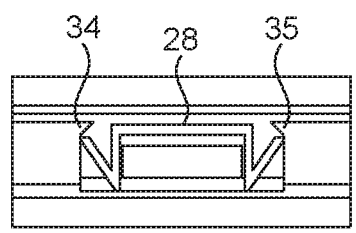
FIG. 17B is a close up view of a region of engagement between a tab of each thrust washer and a corresponding notch of the half-shell bearing of the sliding elements of the embodiments of FIGS. 5 and 10 showing a second example wall feature for opposing ejection of the coupling element(s)
Figure 17C:
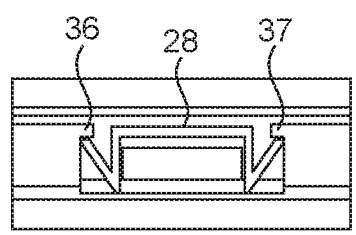
FIG. 17C is a close up view of a region of engagement between a tab of each thrust washer and a corresponding notch of the half-shell bearing of the sliding elements of the embodiments of FIGS. 5 and 10 showing a third example wall feature for opposing ejection of the coupling element(s)
Figure 18A:
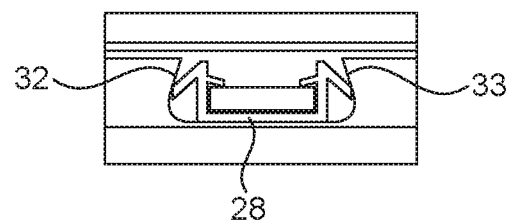
FIG. 18A is a close up view of a region of engagement between a tab of each thrust washer and a corresponding notch of the half-shell bearing of the sliding element of the embodiment of FIG. 16 showing a first example wall feature for opposing ejection of the coupling element(s)
Figure 18B:
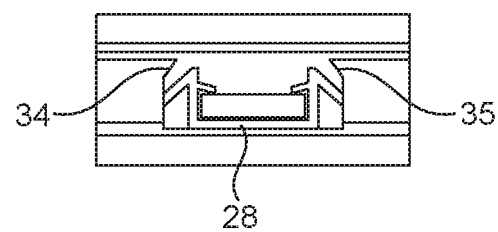
FIG. 18B is a close up view of a region of engagement between a tab of each thrust washer and a corresponding notch of the half-shell bearing of the sliding element of the embodiment of FIG. 16 showing a second example wall feature for opposing ejection of the coupling element(s)
Figure 18C:
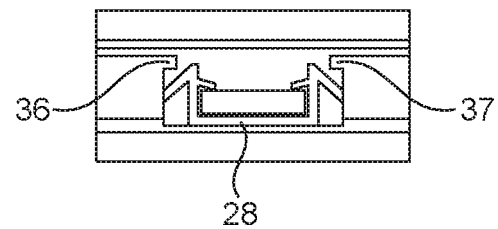
FIG. 18C is a close up view of a region of engagement between a tab of each thrust washer and a corresponding notch of the half-shell bearing of the sliding element of the embodiment of FIG. 16 showing a third example wall feature for opposing ejection of the coupling element(s).

Preferably a wall of each notch is formed with at least one feature that resists or opposes retraction or ejection of the clip from an opening (or mouth) of the notch. For example, as shown in FIGS. 17A to 17C, the notches may have angled side walls 32, 33 that converge towards the mouth, or may have angled portions 34, 35 proximate the mouth. Alternatively, projections or shoulders 36, 37 may be formed proximate the mouth, forming a localised reduction in the width of the notch. These features serve to prevent the clip from being ejected by relative lateral or axial movement of the thrust washers and the half-shell bearing. However, it may still be possible to remove the clip from the notch by relative radial movement of the thrust washers and the half-shell bearing to permit dismantling of the assembly. Other such means for resisting or opposing retraction or ejection of the clip from the notch, at least in the axial or lateral direction, will be apparent to the skilled person. Preferably, the same side wall feature will be used for each of the notches but it will be apparent that a combination of the features 32, 33, 34, 35, 36, 37 shown in FIGS. 17A to 17C, or any other suitable means may be used if required.

As shown in FIGS. 10 to 14 relating to a second example embodiment of the present invention, it may be preferable for the thrust washers 22, 23 to be provided with multiple tabs (in this example—three tabs) for engagement with a corresponding number of notches on the half-shell bearing and an equivalent number of clips 38, 39, 40 to be provided. It may be beneficial to have between three and seven tabs and notches and equivalent clips for each flanged half-bearing assembly, though a greater or lesser number may be provided, if required.

In this embodiment, the tabs may all extend generally towards a centre of curvature of each thrust washer (i.e. normal to a tangent to the inner curved surface of each thrust washer) or may extend generally parallel to one another (i.e. at varying angles to a tangent to the inner curved surface of each thrust washer). The former configuration may make it easier to insert the clips but the latter may make it easier to engage the tabs with their corresponding notches.

Each thrust washer 22, 23 may comprise a thrust washer substrate, which may be a bimetal thrust washer substrate and a sliding layer, commonly referred to as a 'running layer', 'sliding layer' or 'overlay', applied to the thrust washer substrate. The running layer of each thrust washer is preferably a polymer-based running layer.

The half-shell bearing 21 may comprise a bearing substrate, which may be a bimetal substrate and a sliding layer applied to the bearing substrate. The running layer is preferably a polymer-based running layer.

The polymer-based running layer of the thrust washers and/or the half-shell bearing is formed of a running layer material and is formed on the underlying thrust washer substrate to give the thrust washer the desired characteristics e.g. the desired load carrying capacity and wear resistance. The matrix of the running layer material (which generally provides the highest volume percentage portion of the running layer material) is formed of a polymeric material. Examples of suitable polymeric materials comprise: cross-linkable bonding agents; thermosetting plastics; high melting point thermoplastics; materials comprising a matrix of at least one high melting point thermoplastic material; fibre-reinforced plastics; any combination of these materials. Other suitable materials are envisaged and will be readily apparent to the skilled person. Particularly suitable polymeric materials comprise: PAI (Polyamide-imide); PI (Polyimide); epoxy; epoxy resin; phenolic resin; silicone resin; polyether ether ketone or a combination of any of these materials. These materials are characterised by high temperature resistance and excellent media resistance (such as chemical resistance to lubricants). One particularly preferred polymeric material for thrust washers according to preferred embodiments of the present invention is Polyamideimide (PAT).

The running layer material may comprise a composite of a plastics polymer matrix with one or more particulates. For example, running layer material may comprise a hard particulate to provide improved wear resistance (e.g. ceramic powder, silica, and metal powder such as aluminium flakes). Other suitable materials are envisaged and will be readily apparent to the skilled person.

The running layer material may optionally comprise at least one soft particulate e.g. a solid lubricant. Suitable solid lubricants comprise: metal sulphides with layered structures; graphite; hexagonal boron nitride (h-BN); molybdenum disulfide ($MoS_2$); tungsten disulphide ($WS_2$); a fluoropolymer such as PTFE; or a combination of any of these materials. Other suitable materials are envisaged and will be readily apparent to the skilled person.

The running layer material may comprise a matrix of a Polyamide-imide plastics polymer material and comprising distributed throughout the matrix: between about 5% vol and about 15% vol of a metal powder; between about 1% vol and about 15% vol of a fluoropolymer, the balance being the Polyamide-imide resin (apart from incidental impurities).

The running layer material may optionally comprise one or more additional materials or particulates in order to tailor its properties to a particular application, as will be readily apparent to the skilled person.

Optionally, each thrust washer substrate and/or the bearing substrate may comprise an intermediate layer which may provide an improved surface for adhesion of the polymer-based running layer and may be advantageous when certain supporting materials are used. Suitable materials for the optional intermediate layer comprise nickel, silver, copper and/or iron or alloys comprising one or more of such materials. The optional intermediate layer may comprise a combination of two or more or such materials/alloys. The intermediate layer may also comprise an adhesion promoter and/or be subjected to a pre-treatment, for example a phosphating, chromating or silicating treatment. Other suitable materials are envisaged and will be readily apparent to the skilled person.

The clip(s) 28 may be made from metal e.g. spring steel or formed wire. Alternatively the clip(s) may be made from plastics material e.g. from Polyether ether ketone (PEEK) or Polyphthalamide (PPA). Other suitable materials are envisaged and will be readily apparent to the skilled person.

The tab nearest the crown of each thrust washer may be spaced a short distance from the crown and in the same direction on the opposing thrust washers to ensure that they may only be fitted in the correct orientation (i.e. to provide a poka yoke).

Each half-shell bearing may comprise a joint face relief portion at each end to accommodate cap shift.

Each thrust washer may comprises one or more oil distribution grooves 41,42 for permitting through flow of oil to the counterface between the thrust washer and the crankshaft. Each thrust washer may also comprise a chamfer 43 along an outer edge.

Figure 6:
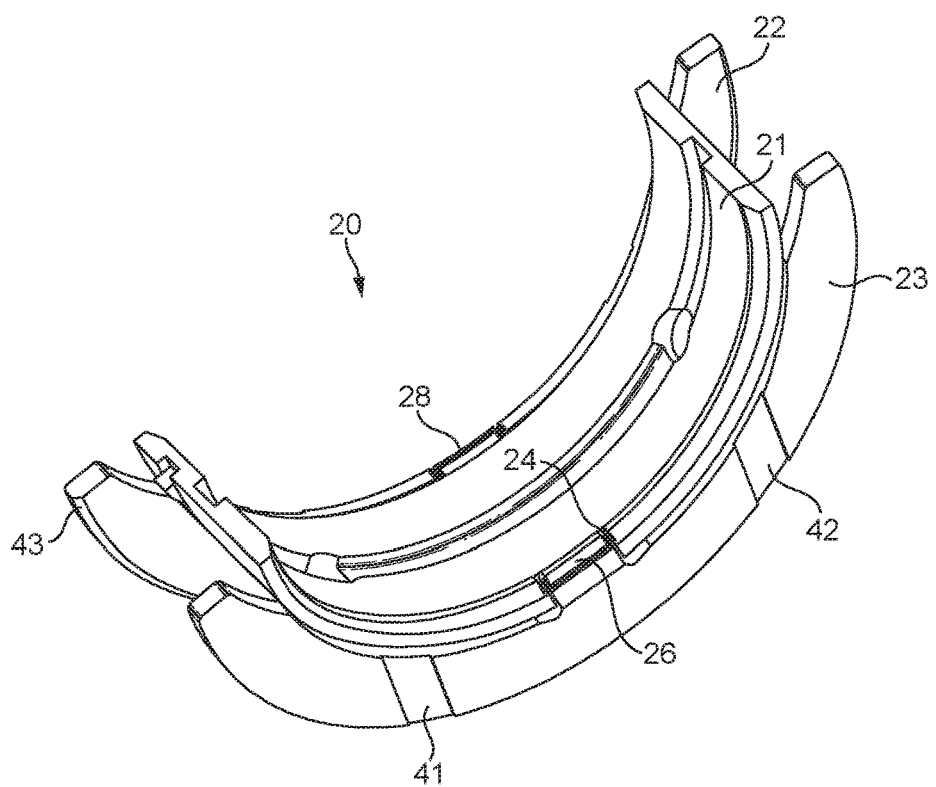
FIG. 6 is a further perspective view of the sliding element of FIG. 5.
Figure 7:
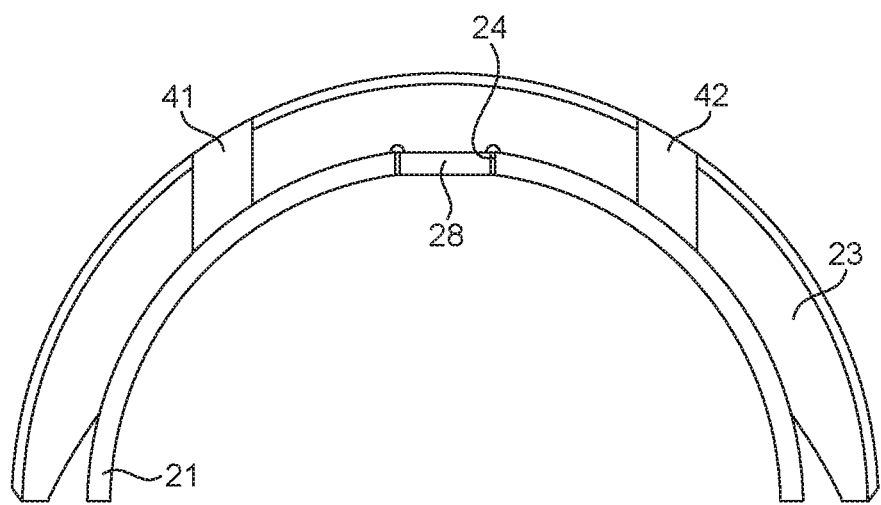
FIG. 7 is a side view of the sliding element of FIG. 5.

As shown in FIGS. 8 and 9 and 13 and 14, assembly outer of the flanged half-bearing involves bringing the thrust washers 22,23 into engagement with the half-shell bearing until the tabs 26,27 on the thrust washers engage with the recesses 24,25 in the half-shell bearing to form the arrangement of FIGS. 5 to 7. Once engaged, the resilient clip(s) may be inserted in to the notch(es) so that the arms of the clip(s) are positioned between the tab and corresponding notch.

It will be appreciated that the clip(s) may be inserted in any one of a number of different ways. For example, the clip(s) may be inserted axially or laterally (i.e. through the opening (or mouth) of the notch) or radially (i.e. by sliding it over the free end of the tab and along the tab into the notch). With either method of insertion, it may be necessary to pinch the arms of the clip(s) relative the central portion so as to match a width of the notch. When the clip(s) is (are) inserted axially or laterally into the notch, it may also be necessary to navigate the sidewall feature.

Figure 15:
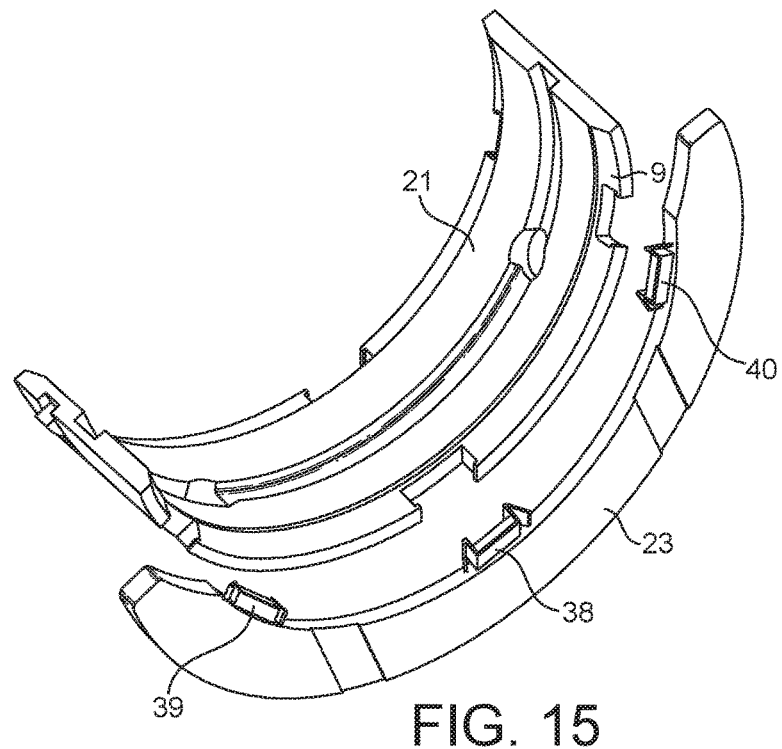
FIG. 15 is an exploded perspective view of the sliding element of FIG. 10 showing one of the thrust washers, the half-shell bearing and the three coupling elements of a first example type in which the coupling elements have been coupled to (or pre-engaged with) the tabs of the thrust washer for engagement with the notches of the half shell bearing as the thrust washer and the half-shell bearing are brought into engagement.

As shown in FIG. 15, the clip(s) may first be coupled to (or pre-engaged with) the tab(s) of each thrust washer and then the thrust washer is engaged with the half-shell bearing so as to engage the clip(s) with the notch(es) on the half-shell bearing. The clip(s) may be permanently coupled to tab(s) of each thrust washer (e.g. using a crimping process or an adhesive) and then each thrust washer is engaged with the half-shell bearing so as to engage the clip(s) with the corresponding notch(es) on the half-shell bearing.

As shown in FIGS. 16 and 18A to 18C relating to a third example embodiment of the present invention, the clip(s), which may have a different shape to the clip(s) of the first and second embodiments discussed above, may first be coupled to (or pre-engaged with) the notch(es) on the half-shell bearing and then each thrust washer is engaged with the half-shell bearing so as to engage the tab(s) of each thrust washer with the clip(s) positioned in the notch(es). Any discussion elsewhere in this specification of the clip(s) of the embodiments of FIGS. 5 to 15 and the wall features of FIGS. 17A and 17C also applies to the clip(s) of the embodiment of FIG. 16 and the wall features of FIGS. 18A and 18C. It will be appreciated that a combination of one or more of the clip(s) of the embodiments of FIGS. 5 to 15 and one or more of the clips of the embodiment of FIG. 16 may be used.

Figure 16:
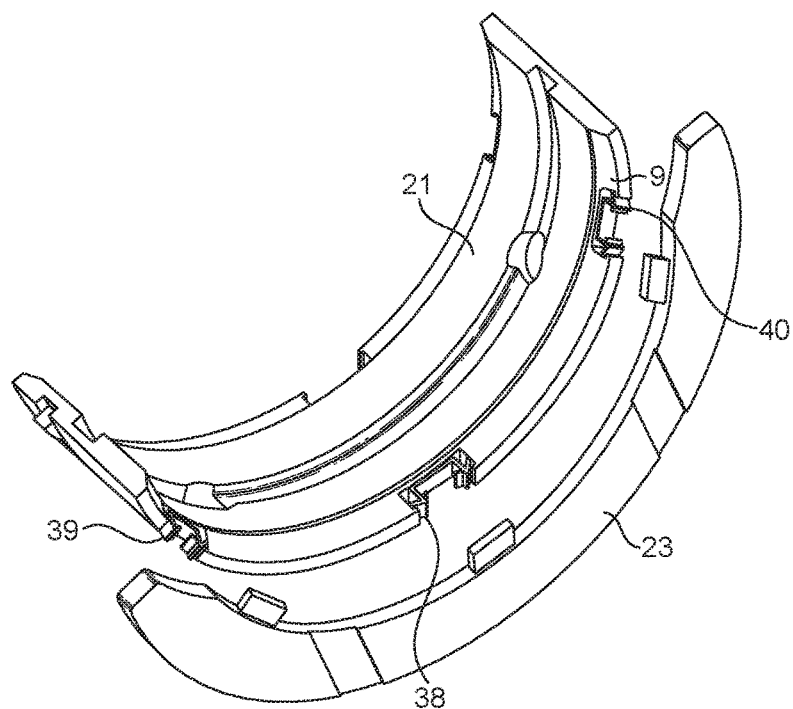
FIG. 16 is an exploded perspective view of an alternative sliding element according to a third example embodiment of the present invention in the form of a flanged half-bearing assembly comprising a half-shell bearing, a pair of thrust washers and three coupling elements of a second example type, showing one of the thrust washers, the half-shell bearing and the three coupling elements, in which the coupling elements have been coupled to (or pre-engaged with) the notches of the half shell bearing for engagement with the tabs of the thrust washer as the thrust washer and the half-shell bearing are brought into engagement.

The clip(s) of the FIG. 16 embodiment are shown with the pair of arms extending at an angle from the free ends of the central portion of the clip(s). In an alternative form of the clips (not shown), the arms may extend from the corners of the central portion of the clip(s) (i.e. extend in an opposite diagonal direction to the arms of the clip(s) shown in FIG. 16) which may simplify insertion of the clip(s) when certain groove profiles are used.

The assembly process may require the use of a jig or fixture (not shown) to hold the thrust washers in engagement with the half-shell bearing while the clip(s) is (are) inserted.

A tool (not shown) may be provided for inserting the clip(s) so as to couple them to the tabs and to the corresponding notches. The tool may be configured to receive a cartridge of clips enabling an operator or an applicator unit to apply one or more clips to multiple sliding elements in quick succession.

In use of the flanged half-bearing, the torque loads on the crankshaft are primarily accommodated by the recesses and tabs which may have loose tolerances as they are not required to hold the flanged half-bearing assembly together during handling and installation. The resilient clip(s) provide(s) the flanged half-bearing assembly with sufficient flexibility to enable alignment of the assembly with a corresponding housing. Preferably the clip(s) is (are) also sufficiently resilient to offer some resistance to circumferential loads during use of the flanged half-bearing assembly (i.e. to offer some resistance to the tendency of the thrust washers to rotate relative to the half-shell bearing under load, e.g. when the crankshaft is rotating) and to prevent the thrust washers from separating from the half-shell bearing during transport and handling.

In a further alternative embodiment (not shown), a combination of means for coupling the thrust washers and half-shell bearing may be used. For example, proximate the crown of each thrust washer, one or more of the resilient clips described above may be may be used and proximate the ends of each thrust washer, one or more tangs such as those used in some prior art flanged half-bearings may be used. This may provide a flanged half-bearing having additional stiffness compared to a flanged half-bearing having only one coupling element or having only tangs. It may also enable the tangs have lower tolerances (i.e. a looser fit) than those that are used in prior art flanged half-bearings.

The invention claimed is:

1. A sliding element for slidably supporting a rotatable shaft, comprising:
a first sliding element component;
a second sliding element component;
at least one coupling element configured to be coupled to the first sliding element component and configured to be coupled to the second sliding element component to releasably couple the first sliding element component and the second sliding element component together, the at least one coupling element including at least one resilient plastic clip;
wherein the at least one resilient plastic clip is a separate single unitary component from the first sliding element component and the second sliding element component; and
wherein the at least one resilient plastic clip is configured to allow for relative movement between at least one engagement feature on the first sliding element component and at least one engagement feature on the second sliding element component.

2. A sliding element according to claim 1, wherein the at least one engagement feature of the first sliding element component is engageable with the at least one engagement feature of the second sliding element component, and wherein the at least one resilient plastic clip is configured to be coupled to the at least one engagement feature of the first sliding element component and to the at least one engagement feature of the second sliding element component to releasably couple the first sliding element component and the second sliding element component together.

3. A sliding element according to claim 2, wherein the at least one engagement feature of the first sliding element component includes a tab and the at least one engagement feature of the second sliding element component includes a notch, and wherein the tab is engageable with the notch.

4. A sliding element according to claim 3, wherein the notch includes a wall having at least one wall feature for resisting ejection of the at least one resilient plastic clip from the notch.

5. A sliding element according to claim 4, wherein the at least one wall feature includes a sloped portion of the wall of the notch.

6. A sliding element according to claim 4, wherein the at least one wall feature includes a projection projecting from the wall of the notch.

7. A sliding element according to claim 1, wherein the at least one engagement feature of the first sliding element component is structured as at least one tab and the at least one engagement feature of the second sliding element component is structured as at least one notch, the at least one tab being engageable with the at least one notch, and wherein the at least one resilient plastic clip is configured to be coupled to the at least one tab and configured to be coupled to the at least one notch to releasably couple the first sliding element component and the second sliding element component together.

8. A sliding element according to claim 7, wherein the at least one notch includes at least one wall feature for resisting ejection of the at least one resilient plastic clip from the at least one notch.

9. A sliding element according to claim 8, wherein the at least one wall feature includes at least one sloped portion of at least one wall of the at least one notch.

10. A sliding element according to claim 8, wherein the at least one wall feature includes at least one projection projecting from at least one wall of the at least one notch.

11. A sliding element according to claim 1, wherein the at least one resilient plastic clip is composed of a different material in relation to a material of at least one of the first sliding element component and the second sliding element component.

12. A sliding element according to claim 1, wherein the at least one resilient plastic clip includes a plurality of resilient plastic clips, wherein each of the plurality of resilient plastic clips is configured to be coupled to the first sliding element component and configured to be coupled to the second sliding element component to releasably couple the first sliding element component and the second sliding element component together.

13. A method of assembling a sliding element for slidably supporting a rotatable shaft, comprising:
providing a first sliding element component;
providing a second sliding element component;
providing at least one coupling element including at least one resilient plastic clip, wherein the at least one resilient plastic clip is a separate single unitary component from the first sliding element component and the second sliding element component;
positioning the first sliding element component and the second sliding element component proximate one another; and
coupling the at least one resilient plastic clip to the first sliding element component and to the second sliding element component to releasably couple the first sliding element component and the second sliding element component together, wherein coupling the at least one resilient plastic clip to the first sliding element component and to the second sliding element component allows for relative movement between at least one engagement feature on the first sliding element component and at least one engagement feature on the second sliding element component.

14. A kit of parts for a sliding element for slidably supporting a rotatable shaft, comprising:
a first sliding element component;
a second sliding element component;
at least one coupling element including at least one resilient plastic clip, wherein the at least one resilient plastic clip is a separate single unitary component from the first sliding element component and the second sliding element component; and
wherein the at least one resilient plastic clip is coupleable to the first sliding element component and to the second sliding element component to releasably couple the first sliding element component and the second sliding element component together when the at least one resilient plastic clip is coupled to the first sliding element component and coupled to the second sliding element component, and wherein the at least one resilient plastic clip is configured to allow for relative movement between at least one engagement feature on the first sliding element component and at least one engagement feature on the second sliding element component.

15. A kit of parts according to claim 14, wherein the at least one engagement feature of the first sliding element component includes at least one tab and the at least one engagement feature of the second sliding element component includes at least one notch, the at least one tab being engageable with the at least one notch, and wherein the at least one resilient plastic clip is structured to couple to the at least one tab and to the at least one notch such that the first sliding element component is releasably coupled to the second sliding element component when the at least one resilient plastic clip is coupled to the at least one tab and the at least one notch.

16. A flanged bearing assembly, comprising:
a first sliding element component having at least one tab;
a second sliding element component having at least one notch constructed and arranged to engage with the at least one tab;
at least one coupling element coupleable to the at least one tab of the first sliding element component and coupleable to the at least one notch of the second sliding element component, wherein the at least one coupling element is a separate single unitary component from the first sliding element component and the second sliding element component, wherein the at least one notch has a wall including at least one wall feature for resisting ejection of the at least one coupling element from the at least one notch, the at least one wall feature including at least one projection projecting from the wall of the at least one notch; and
wherein the first sliding element component and the second sliding element component are releasably coupled together to define a sliding element when the at least one coupling element is coupled to the at least one tab of the first sliding element component and coupled to the at least one notch of the second sliding element component.

17. A flanged bearing assembly according to claim 16, wherein the at least one coupling element includes at least one of a resilient fastener and a resilient clip.

18. An engine, comprising:
a sliding element for slidably supporting a rotatable shaft, wherein the sliding element includes:
a first sliding element component including at least one first engagement feature, the at least one first engagement feature including a tab;
a second sliding element component including at least one second engagement feature, the at least one second engagement feature including a notch engageable with the tab of the first sliding element component;
at least one coupling element coupleable to the tab of the first sliding element component and coupleable to the notch of the second sliding element component, wherein the at least one coupling element is a separate single unitary component from the first sliding element component and the second sliding element component;
wherein the first sliding element component is releasably coupled to the second sliding element component to define the sliding element when the at least one coupling element is coupled to the first sliding element component and coupled to the second sliding element component; and
wherein the notch of the second sliding element component has a wall including at least one wall feature for resisting ejection of the at least one coupling element from the notch, the at least one wall feature including a projection projecting from the wall of the notch.

19. An engine according to claim 18, wherein the at least one coupling element includes at least one resilient fastener.

* * * * *